United States Patent
Goh et al.

(10) Patent No.: US 7,480,002 B2
(45) Date of Patent: Jan. 20, 2009

(54) DIGITAL PHOTOGRAPHING APPARATUS THAT PERFORMS INTEGRATED DISPLAY MODE AND METHOD OF CONTROLLING THE SAME

(75) Inventors: Ji-hyun Goh, Seongnam-si (KR); Nyun-woo Nam, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 703 days.

(21) Appl. No.: 11/064,411

(22) Filed: Feb. 23, 2005

(65) Prior Publication Data

US 2006/0098111 A1 May 11, 2006

(30) Foreign Application Priority Data

Nov. 10, 2004 (KR) .................. 10-2004-0091520

(51) Int. Cl.
*H04N 5/222* (2006.01)
(52) U.S. Cl. .................. 348/333.05; 348/333.11; 348/333.01
(58) Field of Classification Search ........ 348/333.05, 348/333.11, 333.99, 333.12
See application file for complete search history.

(56) References Cited

U.S. PATENT DOCUMENTS

| 6,344,907 B1 * | 2/2002 | Watanabe et al. ........... 358/448 |
| 6,515,704 B1 * | 2/2003 | Sato ..................... 348/333.11 |
| 7,196,727 B2 * | 3/2007 | Sato ..................... 348/333.11 |

FOREIGN PATENT DOCUMENTS

| CN | 1205151 A | 1/1999 |
| JP | 09-154048 A | 6/1997 |
| JP | 10-243273 A | 9/1998 |

* cited by examiner

*Primary Examiner*—David L Ometz
*Assistant Examiner*—Tuan H Le
(74) *Attorney, Agent, or Firm*—Drinker Biddle & Reath LLP (57) ABSTRACT

Provided is a method of controlling a digital photographing apparatus that displays a preview image, which is an image formed by light incident through an optical system, and a plurality of images stored in a storage medium on a main area and a plurality of sub-areas of a display panel. In the method, if a first stored image displayed on a first sub-area is selected in response to a command signal generated by a user when the preview image is displayed on the main area of the display panel, the first stored image is displayed on the main area and the preview image is displayed on the first sub-area.

20 Claims, 11 Drawing Sheets

DIGITAL PHOTOGRAPHING APPARATUS THAT PERFORMS INTEGRATED DISPLAY MODE AND METHOD OF CONTROLLING THE SAME

CROSS-REFERENCE TO RELATED PATENT APPLICATIONS

This application claims the priority of Korean Patent Application No. 10-2004-0091520, filed on Nov. 10, 2004, in the Korean Intellectual Property Office, the disclosure of which is incorporated herein in its entirety by reference.

BACKGROUND OF THE INVENTION

1. Field of the Invention

The present invention relates to a digital photographing apparatus and a method of controlling the same, and more particularly, to a method of controlling a digital photographing apparatus that displays a preview image, which is an image formed by light incident through an optical system, and a plurality of images stored in a storage medium on a main area and a plurality of sub-areas of a display panel, and a digital photographing apparatus using the method.

2. Description of the Related Art

A conventional digital photographing apparatus disclosed in Japanese Patent Publication No. 1998-243273, "Image Display Method for Digital Camera," displays a preview image, which is an image formed by light incident through an optical system, and a plurality of images stored in a storage medium in a main area and a plurality of sub-areas of a display panel. The preview image is always displayed in the main area. In other words, if an image in a sub-area is selected and displayed in the main area, the preview image is not displayed.

Thus, when the image in the sub-area is selected and displayed in the main area, a user cannot immediately take a photograph of a subject using the conventional digital photographing apparatus since the user has to perform an additional operation to display the preview image in the main area so as to take a photograph of the subject.

SUMMARY OF THE INVENTION

The present invention provides a digital photographing apparatus and a method of controlling the same that enable a user to quickly and easily perform photographing and reproducing operations.

According to an aspect of the present invention, there is provided a method of controlling a digital photographing apparatus that displays a preview image, which is an image formed by light incident through an optical system, and a plurality of images stored in a storage medium on a main area and a plurality of sub-areas of a display panel. The method includes displaying a first stored image on the main area and displaying the preview image on the first sub-area, if the first stored image displayed on a first sub-area is selected in response to a command signal generated by a user when the preview image is displayed on the main area of the display panel.

In the method, when the first stored image that was selected is displayed on the main area, the preview image is displayed on the first sub-area. Thus, a user does not need to perform an additional operation to display the preview image on the main area to take a photograph. Accordingly, the user can immediately take a photograph of a subject even when a selected image is displayed on the main area. In other words, the user can perform photographing and reproducing operations easily and quickly.

According to another aspect of the present invention, there is provided a digital photographing apparatus using the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
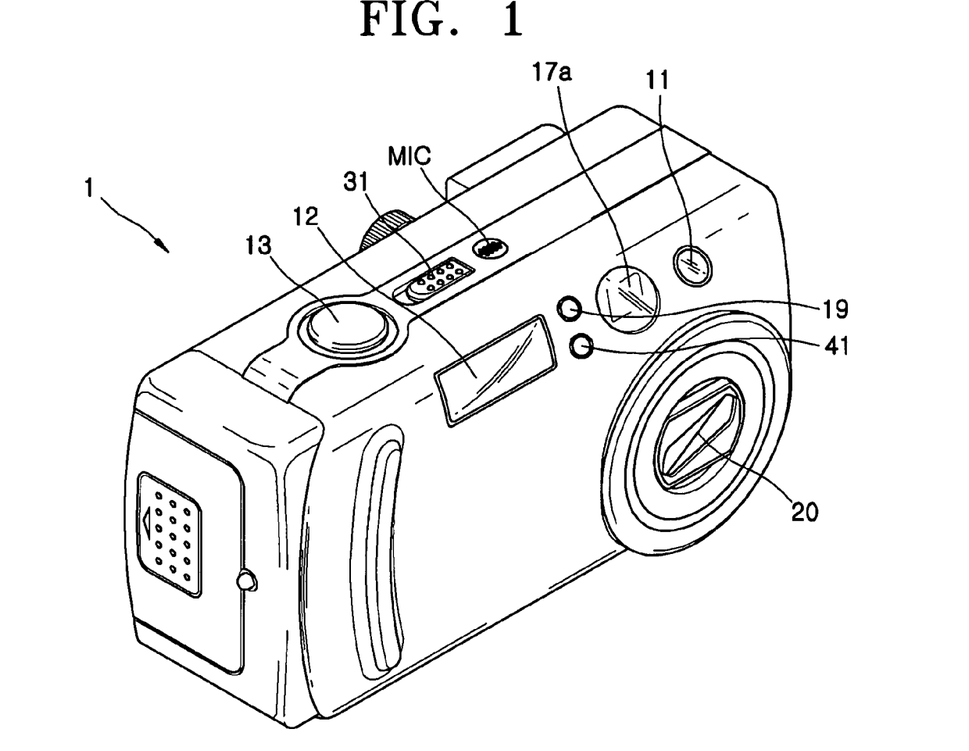
FIG. 1 is a perspective view illustrating the front and the top of a digital camera according to the present invention.

Referring to FIG. 1, the front part of a digital camera 1 according to the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from the time when the shutter release button 13 is pressed to the time when an image starts to be captured. When the flash 12 operates, the flash light intensity sensor 19 senses the intensity of the light generated by the flash 12 and relays the sensed intensity of the light to a digital signal processor (DSP) 507 of FIG. 3 via a micro-controller 512 of FIG. 3. The remote receiver 41 receives command signals, for example, a photographing command signal, from a remote controller (not shown) and relays the photographing command signal to the DSP 507 via the micro-controller 512.

The shutter release button 13 has two levels. In other words, after operating a wide-angle zoom button $39_W$ and a telephoto zoom button $39_T$, when a user lightly depresses the shutter release button 13 to a first level, a first level signal S1 from the shutter release button 13 is turned on. When the user fully depresses the shutter release button 13 to a second level, a second level signal S2 from the shutter release button 13 is turned on.

Figure 2:
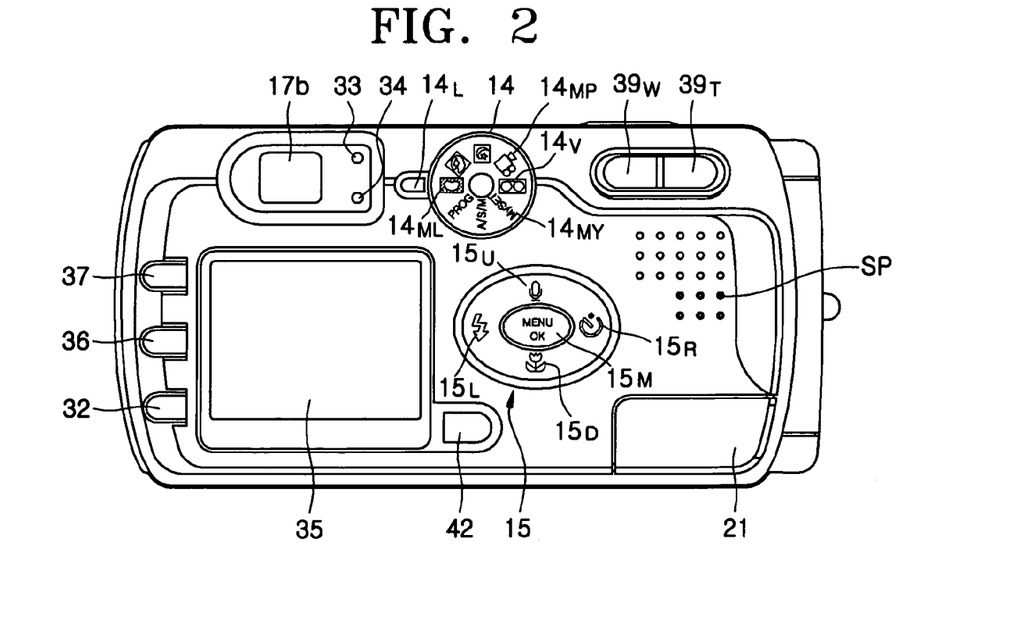
FIG. 2 is a perspective view illustrating the back of the digital camera of FIG. 1.

Referring to FIG. 2, the back of the digital camera 1 according to the present invention includes a mode dial 14, functional buttons 15, a manual focus/delete button 36, a manual adjust/reproduce/terminate button 37, a reproduction mode button 42, a speaker SP, a monitor button 32, an automatic focusing lamp 33, a viewfinder 17b, a flash standby lamp 34, a color LCD panel 35, the wide-angle zoom button $39_W$, the telephoto zoom button $39_T$, and an external interface unit 21.

The mode dial 14 is used for selecting the operating modes of the digital camera 1, such as a simple photographing mode, a program photographing mode, a character photographing mode, a night view photographing mode, a manual photographing mode, a moving-image photographing mode $14_{MP}$, a user-setting mode $14_{MY}$, and a recording mode $14_V$.

The user-setting mode $14_{MY}$ is an operating mode where a user decides photograph-taking settings for each photographing mode. The recording mode $14_V$ is for recording only sounds, for example, a user's voice. After selecting the recording mode $14_V$, when a user presses the shutter release button 13, an audio file is created in the memory card and audio data is stored in the audio file. When the user presses the shutter release button 13 again, the audio data stops being stored and the audio file is set.

The functional buttons 15 are used for operating specific functions of the digital camera 1 and the functional buttons 15 are also used as control buttons to manage the movement of an active cursor on the menu screen of the color LCD panel 35. For example, in an integrated display mode, the user can change images displayed in the main area and sub-areas by pressing a macro/down button $15_D$, a voice-memo/up button $15_U$, and a menu/select-confirm button $15_M$. The integrated display mode will be described in detail later with reference to FIGS. 5 through 9 and 12 through 17.

In a reproduction mode, if an image currently displayed is not enlarged, when the user presses a self-timer/right button $15_R$, a next file in a forward direction is displayed. If an image currently displayed is enlarged, when the user presses the self-timer/right button $15_R$, a display area of the enlarged image is moved to the right. In a preview mode, if the user presses the self-timer/right button $15_R$, a self-timer operation, e.g., automatic photographing after 10 seconds, is performed.

In the reproduction mode, if the image currently displayed is not enlarged, when the user presses a flash/left button $15_L$, a next file in a reverse direction is displayed. If the image currently displayed is enlarged, when the user presses the flash/left button $15_L$, the display area of the enlarged image is moved to the left.

In the preview mode, if the user presses the flash/left button $15_L$, any one of the flash modes for a photographing mode is set.

In the reproduction mode, if the image currently displayed is enlarged, when the user presses a macro/down button $15_D$, the display area of the enlarged image is moved up. In the preview mode, the user may set automatic proximity focusing by pressing a macro/down button $15_D$.

In the reproduction mode, when the image currently displayed is enlarged, if the user presses a voice-memo/up button $15_U$, the display area of the enlarged image is moved down. In the preview mode, if the user presses the voice-memo/up button $15_U$, a 10 second recording is possible upon consecutive photographing.

In a setting mode from the preview mode, if the user presses a menu/select-confirm button $15_M$ when the active cursor is on a selection menu, the operation corresponding to the selection menu is performed.

The manual adjust/reproduce/terminate button 37 is used for manual adjustment of specific conditions. In the reproduction mode, when the user presses the manual adjust/reproduce/terminate button 37, a selected moving-image file may be reproduced or its reproduction may be terminated.

The manual focus/delete button 36 is used for manual focusing or deleting in the photographing mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only images are displayed.

The reproduction mode button 42 is used for switching between the reproduction mode and the preview mode.

The automatic focusing lamp 33 operates when a focus is well adjusted. The flash standby lamp 34 operates when the flash 12 of FIG. 1 is in a standby mode. A mode indicating lamp $14_L$ indicates a selection mode of the mode dial 14.

Figure 3:
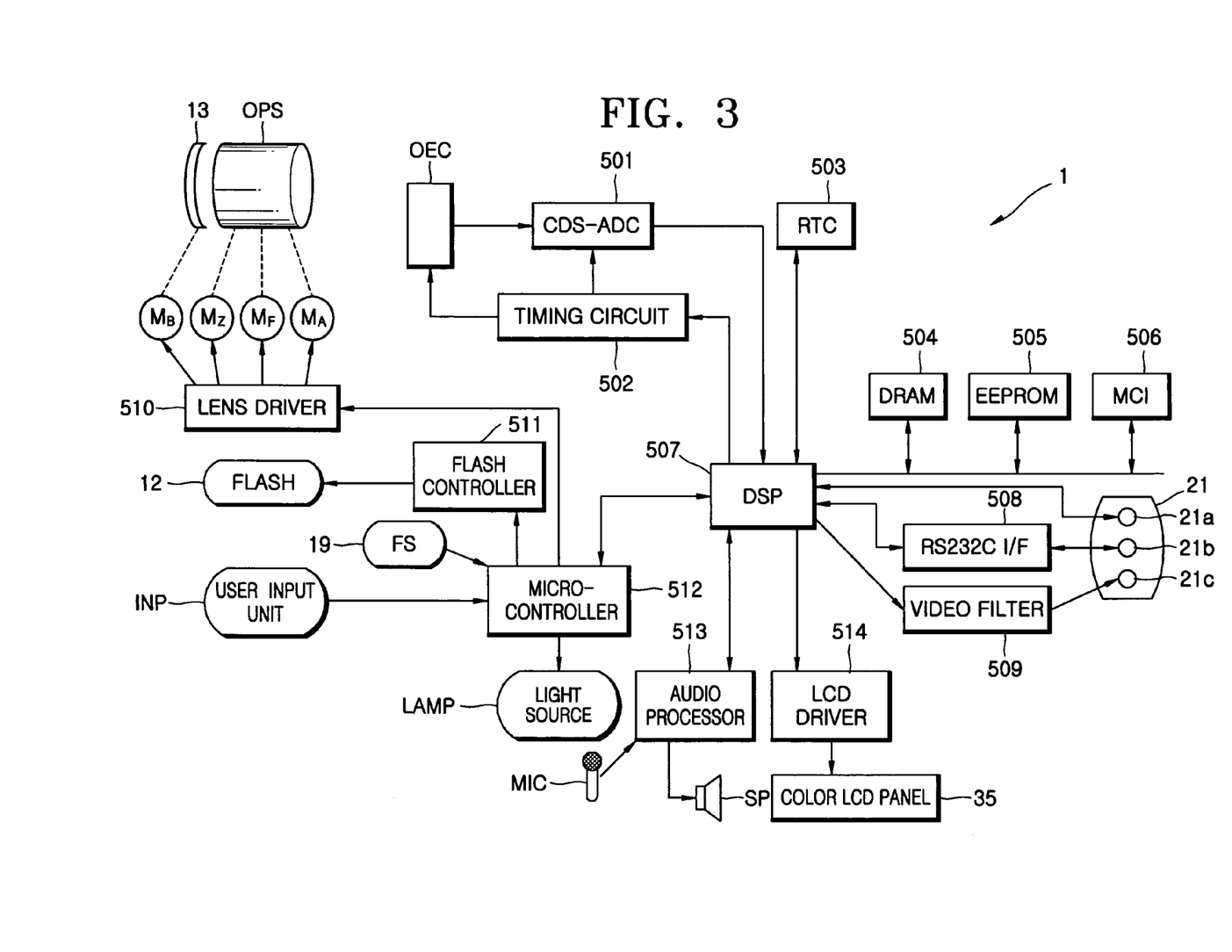
FIG. 3 is a block diagram illustrating the configuration of components for the digital camera of FIG. 1.

FIG. 3 is a block diagram illustrating the configuration exemplary components of the digital camera 1. The configuration and operation of the digital camera 1 of FIG. 1 will now be described with reference to FIGS. 1 through 3.

An optical system (OPS) including the lens unit 20 and a filter unit optically processes light. The lens unit 20 of the OPS includes a zoom lens, a focal lens, and a compensation lens.

When the user presses the wide angle-zoom button $39_W$ or the telephoto-zoom button $39_T$ included in a user input unit (INP), a signal corresponding to the wide angle-zoom button $39_W$ or the telephoto-zoom button $39_T$ is relayed to the micro-controller 512. The micro-controller 512 controls a lens driver 510, thereby running a zoom motor $M_Z$, which in turn, moves the zoom lens. In other words, when the user presses the wide angle-zoom button $39_W$, the focus length of the zoom lens becomes short, thereby widening the angle of view. When the user presses the telephoto-zoom button $39_T$, the focus length of the zoom lens becomes long, thereby narrowing the angle of view. Since the position of the focus lens is adjusted in a state where the position of the zoom lens is set, the angle of view is hardly affected by the position of the focus lens.

In the automatic focusing mode, a main controller built into the DSP 507 controls the lens driver 510 through the micro-controller 512, thereby driving a focus motor $M_F$. Accordingly, when the focus lens is moved, the position of the focus lens, for example, a number of driving steps of the focus motor $M_F$, having a largest high frequency component of an image signal is set.

The compensation lens in the lens unit 20 of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DSP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DSP 507. The DSP 507 processes the digital signal from the CDS-ADC 501 and generates a digital image composed of luminance and chromaticity values.

A light source (LAMP) is operated by the micro-controller 512 in response to a control signal generated by the DSP 507 including the main controller. The light source (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focus/delete button 36, the manual adjust/reproduce/terminate button 37, the wide angle-zoom button $39_W$, and the telephoto-zoom button $39_T$.

A dynamic random access memory (DRAM) 504 temporarily stores a digital image signal from the DSP 507. An electrically erasable and programmable read only memory (EEPROM) 505 stores algorithms and setting data. A user's memory card is inserted or removed in a memory card interface 506. The digital image signal from the DSP 507 is input to an LCD driver 514, thereby displaying an image on the color LCD panel 35.

The digital image signal from the DSP 507 can be transmitted via a universal serial bus (USB) connector 21a or via an RS232C interface 508 and an RS232C connector 21b for serial communications. The digital image signal from the DSP 507 can also be transmitted via a video filter 509 and a video output unit 21c as a video signal. Here, the DSP 507 includes the main controller.

An audio processor 513 can relay sound from the microphone MIC to the DSP 507 or to speaker SP. In addition, the audio processor 513 can output an audio signal from the DSP 507 to the speaker SP. The micro-controller 512 controls the operation of a flash controller 511 in response to a signal from the flash light intensity sensor 19, thereby driving the flash 12.

A main algorithm of the DSP 507 of FIG. 3 will be now described with reference to FIGS. 1 through 4.

Figure 4:
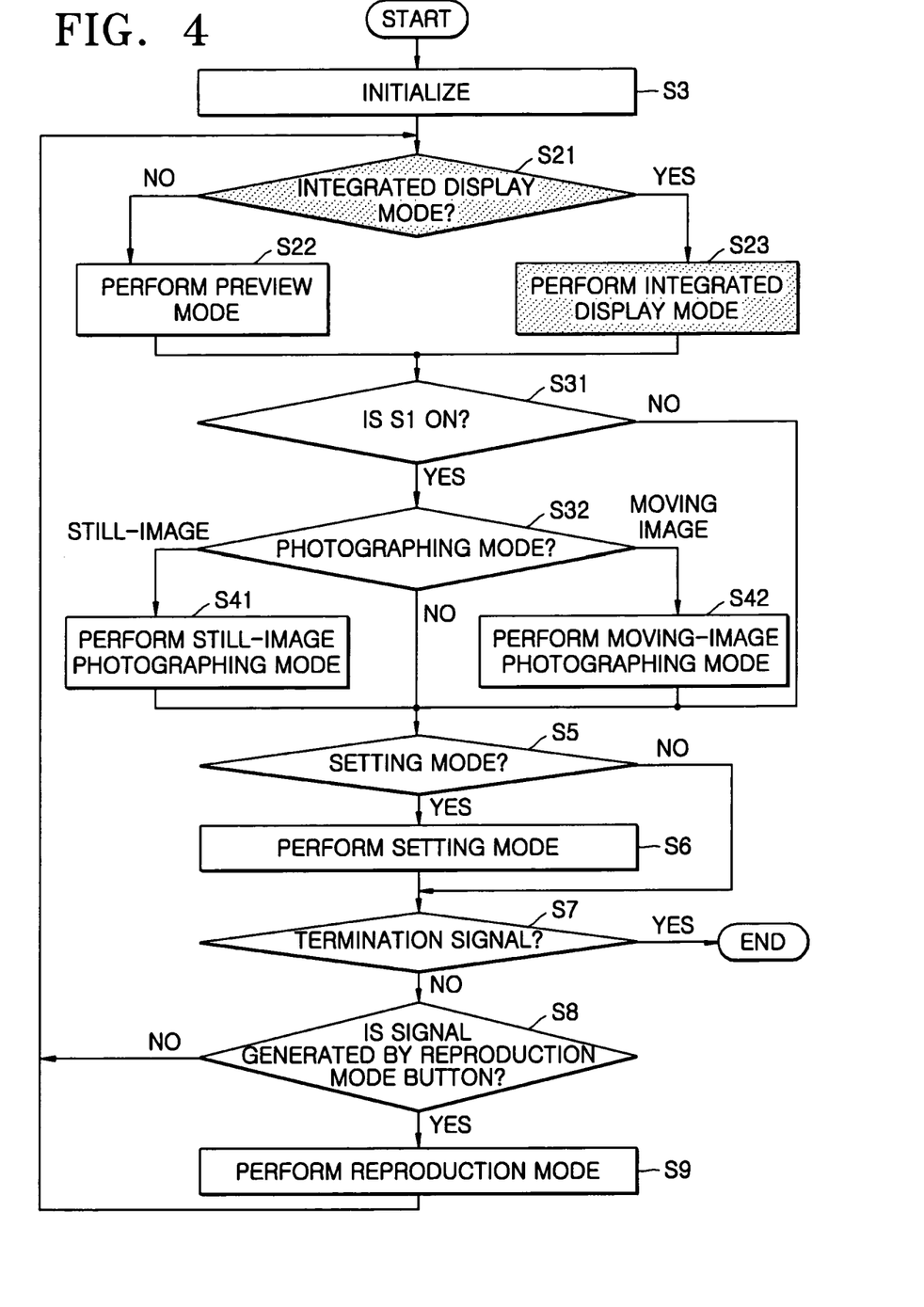
FIG. 4 is a flowchart illustrating a main algorithm of a digital signal processor (DSP) illustrated in FIG. 3.

When power is applied to the digital camera 1, the DSP 507 is initialized (S3). After the initialization (S3), the DSP 507 determines whether an integrated display mode has been set (S21). If the integrated display mode has not been set, the DSP 507 performs the preview mode, which is a standby mode for taking a photograph (S22). In other words, a preview image similar to an image seen through the viewfinder 17a, 17b, which is a constantly changing image relative to a light incident through the OPS, is displayed on all areas of the color LCD panel 35.

If the integrated display mode has been set, the DSP 507 performs the integrated display mode (S23). In the integrated display mode the preview image and a plurality of images stored in a storage medium such as a memory card are selectively displayed in the main area and sub-areas of the color LCD panel 35. In this case, when the preview image is displayed on the main area of the color LCD panel 35, if a first stored image displayed on a first sub-area is selected according to a command signal generated by the user, the first stored image is displayed on the main area and the preview image is displayed on the first sub-area. Further, the preview image is given a display priority so that the preview image is displayed even in the reproducing mode so that a user can photograph an image while reviewing stored images.

Therefore, since the preview image is displayed on one of the first sub-area and the main area when the first stored image is displayed on the other one of the first sub-area and the main area not displaying the preview image, the user does not need to do additional operation (e.g., change the camera operating mode by actuating the mode dial 14) to display the preview image on the main area and take a photograph. Accordingly, the user can immediately take a photograph of a subject even though the first stored image is displayed on the main area. That is, the user can perform photographing and reproducing operations quickly and easily. The integrated display mode algorithm will be described in detail later with reference to FIGS. 5 through 9 and 12 through 17.

When the user lightly depresses the shutter release button 13 to the first level and the first level signal S1 from the shutter release button 13 is turned on (S31) the DSP 507 determines a current operating mode (S32) that the camera 1 is set to. The DSP 507 next performs the still-image photographing mode (S41) or the moving-image photographing mode (S42) according to the determined current operation mode. When in the integrated display mode (S23), the DSP 507 performs the still-image photographing mode or the moving-image photographing mode while the integrated display mode is maintained (i.e., the preview image is constantly displayed on at least a portion of the display 35).

The still-image photographing mode (S41) algorithm will be described later with reference to FIG. 10. The moving-image photographing mode (S42) algorithm will be described later with reference to FIG. 11.

When INP generated signals corresponding to a setting mode are input (S5), the setting mode for setting an operating condition in response to the signals received from the INP is performed (S6). For example, in step S6 when the camera is set in the preview mode (S22) and when a flash button signal is generated (e.g., after the user presses the flash/left button $15_L$), the setting mode for setting a flash mode is performed. While the flash mode is being performed (S6), the preview mode (S22) or the integrated display mode (S23) is not performed.

When a termination signal is not generated (S7), the DSP 507 continues to perform the following operations.

When a signal is generated by the reproduction mode button 42 in the INP (S8), the DSP 507 performs the reproduction mode (S9). In the reproduction mode, the DSP 507 performs the reproduction operation (i.e., displaying stored images from the storage medium on the display) in response to the signals received from the INP. While the reproduction mode is being performed (S9), the preview mode (S22) or the integrated display mode (S23) is not performed. When the reproduction mode is terminated, the above operations are repeated.

Figure 5:
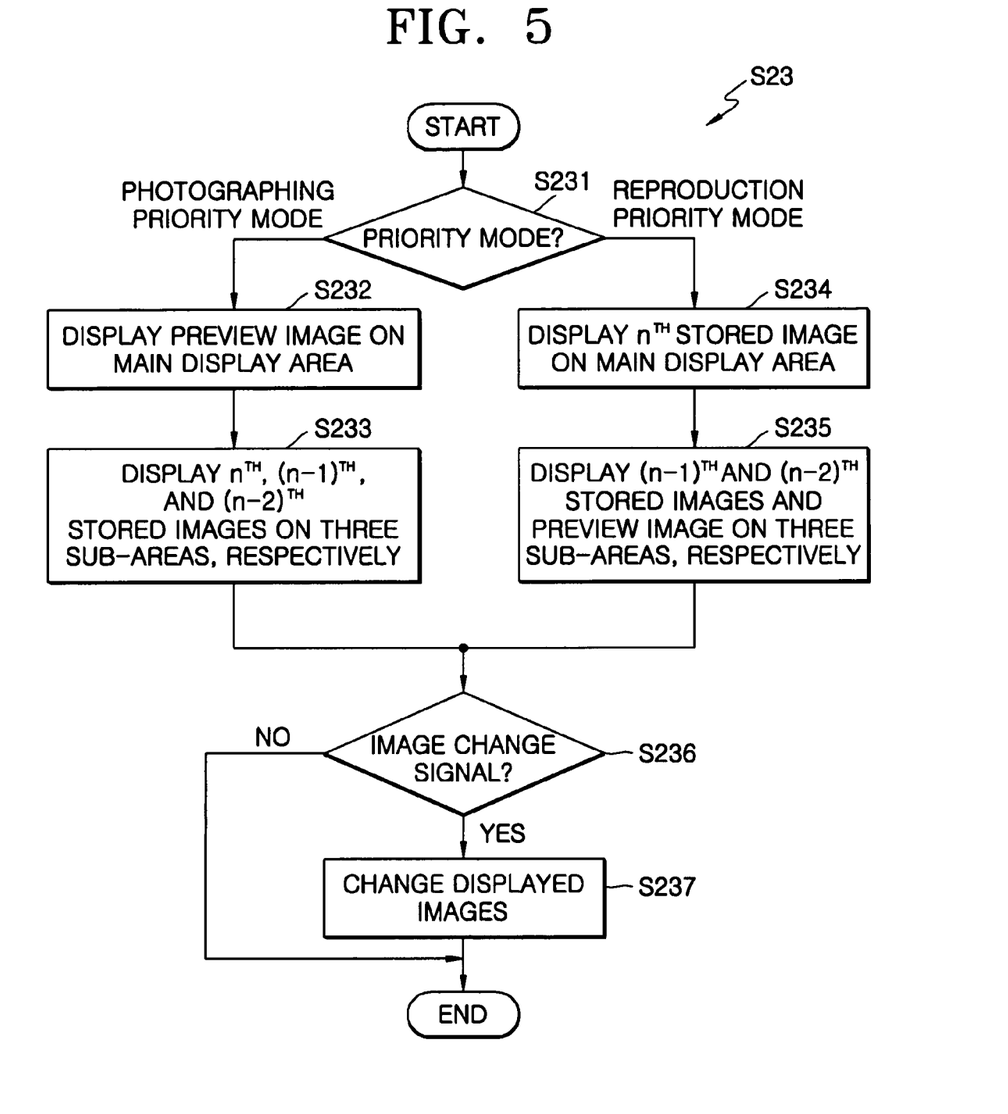
FIG. 5 is a flowchart illustrating the first example of the integrated display mode algorithm of FIG. 4.
Figure 6:
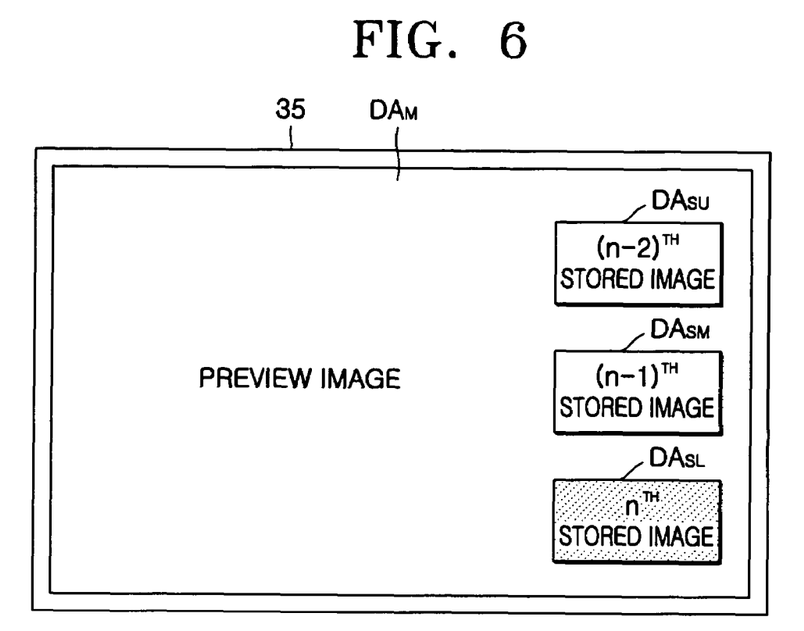
FIG. 6 is a view illustrating an example of a screen displayed on a color LCD panel and obtained as a result of performing operation S233 illustrated in FIG. 5.
Figure 7:
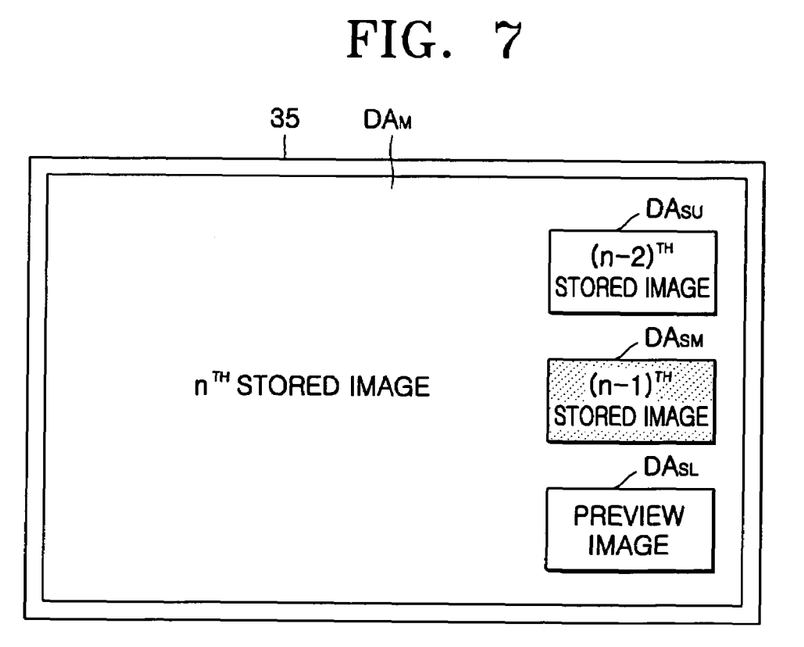
FIG. 7 is a view illustrating a screen displaying images different from those on the screen of FIG. 6 as a result of selecting an $n^{th}$ stored image on the screen of FIG. 6 in operations S236 and S237 of FIG. 5.
Figure 8:
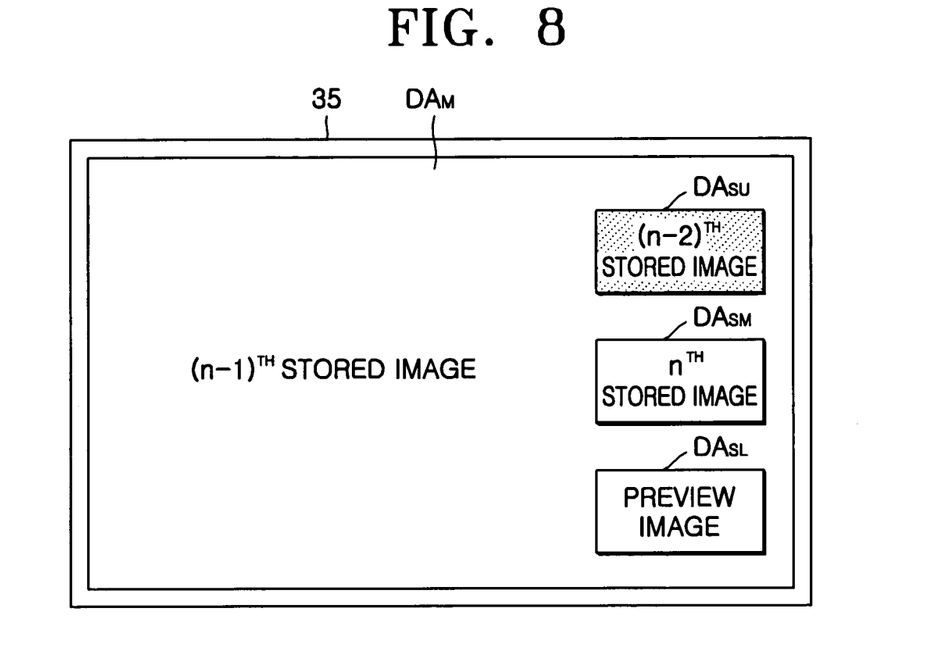
FIG. 8 is a view illustrating a screen displaying stored images different from those on the screen of FIG. 7 as a result of selecting an $(n-1)^{th}$ stored image on the screen of FIG. 7 in operations S236 and S237 of FIG. 5.
Figure 9:
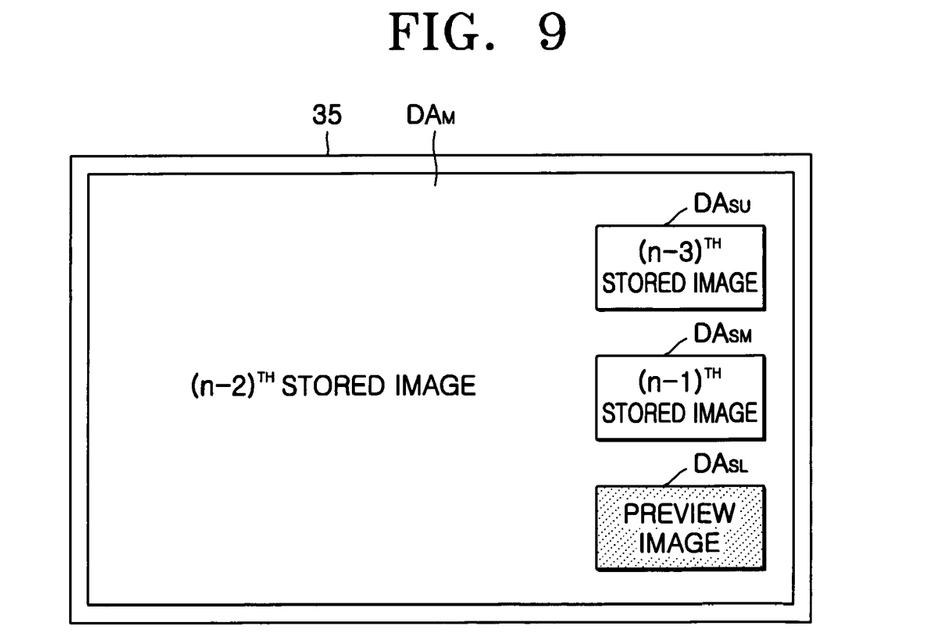
FIG. 9 is a view illustrating a screen displaying stored images different from those on the screen of FIG. 8 as a result of selecting an $(n-2)^{th}$ stored image on the screen of FIG. 8 in operations S236 and S237 of FIG. 5.

FIG. 5 is a flowchart illustrating the first example of the integrated display mode (S23) algorithm of FIG. 4. FIG. 6 is a view illustrating an example of a screen displayed on the color LCD panel 35 and obtained as a result of performing operation S233 illustrated in FIG. 5. FIG. 7 is a view illustrating a screen displaying images different from those on the screen of FIG. 6 as a result of selecting an $n^{th}$ stored image on the screen of FIG. 6 in operations S236 and S237 of FIG. 5. FIG. 8 is a view illustrating a screen displaying stored images different from those on the screen of FIG. 7 as a result of selecting an $(n-1)^{th}$ stored image on the screen of FIG. 7 in operations S236 and S237 of FIG. 5. FIG. 9 is a view illustrating a screen displaying stored images different from those on the screen of FIG. 8 as a result of selecting an $(n-2)^{th}$ stored image on the screen of FIG. 8 in operations S236 and S237 of FIG. 5. A main display area $DA_M$ may refer to all areas of a display panel or particular areas excluding sub-areas.

As shown in FIG. 5, the camera 1 (e.g., DSP 507) identifies what priority mode is set together with the current integrated display mode (S231).

When a photographing priority mode is set, the DSP 507 displays the preview image on the main display area $DA_M$ of the color LCD panel 35 as illustrated in FIG. 6 (S232). Then, the DSP 507 displays the $n^{th}$, $(n-1)^{th}$, and $(n-2)^{th}$ stored images on, for example, three sub-display areas, respectively (S233). Here, the $n^{th}$ stored image is displayed on a lower sub-area $DA_{SL}$ as a first sub-area, the $(n-1)^{th}$ stored image is displayed on a middle sub-area $DA_{SM}$ as a second sub-area, and the $(n-2)^{th}$ stored image is displayed on an upper sub-area $DA_{SU}$ as a third sub-area. Of course, $n^{th}$, $(n-1)^{th}$, and $(n-2)^{th}$ stored images may be arranged otherwise in the sub-areas.

In operation S233, for example, n is set to a maximum value when the digital camera 1 is turned on and starts to operate. Since the images stored in the storage medium of the camera may be identified by increasing incrementally numbered file names according to the chronological order in which the images are stored, an image stored after a most recent photographing operation (i.e., the highest numbered image file) is displayed on the lower sub-area $DA_{SL}$ of the color LCD panel 35. However by performing operations S236 and S237 in response to the image change signal generated by the user, the displayed images may be incremented or decremented accordingly and rearranged in the sub-areas while the preview image is maintained in the main display area.

Alternatively, when a reproduction priority mode is determined to be set in step S231, the DSP 507 performs step S234 to display the $n^{th}$ stored image on the main display area $DA_M$ of the color LCD panel 35 as illustrated in FIG. 7. Then, the DSP 507 displays the $(n-1)^{th}$ stored image, the $(n-2)^{th}$ stored image, and the preview image on the three sub-display areas, respectively (S235). Here, the preview image is displayed on the lower sub-area $DA_{SL}$ as the first sub-area, the $(n-1)^{th}$ stored image is displayed on the middle sub-area $DA_{SM}$ as the second sub-area, and the $(n-2)^{th}$ stored image is displayed on the upper sub-area $DA_{SU}$ as the third sub-area, but the preview image, $(n-1)^{th}$, and $(n-2)^{th}$ images may be arranged otherwise.

As in operation S233, in operation S235, n is set to a maximum value when the digital camera 1 is turned on and starts to operate. In other words, the $n^{th}$ image is that image stored after a most recent photographing operation and it is displayed on the main display area $DA_M$ of the color LCD panel 35. However, if operation S233 is performed again after operations S236 and S237 in response to the image change signal generated by the user, n is changed (e.g., incremented or decremented) according to changes of displayed images in operation S237. For example, by incrementing n, a first image stored in the storage medium replaces the $n^{th}$ image, whereas by decrementing n, an $(n-1)^{th}$ image replaces the $n^{th}$ image or vice versa.

When the user presses the macro/down button $15_D$, the voice-memo/up button $15_U$ and the menu/select-confirm button $15_M$, and an image change signal is generated by the INP, the DSP 507 changes the images displayed (S236 and S237). Thus the user can essentially scroll through the stored images.

For example, when the user presses the voice-memo/up button $15_U$ after activating the upper sub-area $DA_{SU}$ by pressing the voice-memo/up button $15_U$ while the screen of FIG. 6 is maintained, the preview image continues to be displayed on the main display area $DA_M$ while the $(n-1)^{th}$ stored image is displayed on the lower sub-area $DA_{SL}$ as the first sub-area, the $(n-2)^{th}$ stored image is displayed on the middle sub-area $DA_{SM}$ as the second sub-area, and an $(n-3)^{th}$ stored image is displayed on the upper sub-area $DA_{SU}$ as the third sub-area. In other words, the reproduction operation is performed while the preview image is displayed.

When the user presses the macro/down button $15_D$ after activating the lower sub-area $DA_{SL}$ by pressing the macro/down button $15_D$ while the screen of FIG. 7 is maintained, the preview image continues to be displayed on the lower sub-area $DA_{SL}$ and the $n^{th}$ stored image continues to be displayed on main display area $DA_M$ while an $(n+1)^{th}$ stored image is displayed on the middle sub-area $DA_{SM}$ as the second sub-area and the $(n-1)^{th}$ stored image is moved from the middle sub-area $DA_{SM}$ as the second sub-area to the upper sub-area $DA_{SU}$ as the third sub-area.

When the $n^{th}$ stored image on the lower sub-area $DA_{SL}$ is activated in the photographing priority mode as illustrated in FIG. 6, if the user presses the menu/select-confirm button $15_M$ for a long time or twice, the $n^{th}$ stored image on the lower sub-area $DA_{SL}$ is displayed on the main display area $DA_M$, and the preview image on the main display area $DA_M$ is displayed on the lower sub-area $DA_{SL}$ as illustrated in FIG. 7. That is, images on a selected sub-area and the main display area $DA_M$ are swapped, exchanged or the like. Here, other buttons may be used instead of the menu/select-confirm button $15_M$.

When the preview image on the lower sub-area $DA_{SL}$ is activated in FIG. 7 of the reproduction priority mode, if the user presses the menu/select-confirm button $15_M$, the preview image on the lower sub-area $DA_{SL}$ is displayed on the main display area $DA_M$, and the $n^{th}$ stored image on the main display area $DA_M$ is displayed on the lower sub-area $DA_{SL}$. In other words, an image on a selected sub-area and an image on the main display area $DA_M$ are exchanged, toggled or otherwise swapped.

When the $(n-1)^{th}$ stored image on the middle sub-area $DA_{SM}$ is activated in the reproduction priority mode as illustrated in FIG. 7, if the user presses the menu/select-confirm button $15_M$, the preview image continues to be displayed on the lower sub-area $DA_{SL}$, the activated $(n-1)^{th}$ stored image is displayed on the main display area $DA_M$, the $n^{th}$ stored image is displayed on the middle sub-area $DA_{SM}$, and the $(n-2)^{th}$ stored image is displayed on the upper sub-area $DA_{SU}$ as illustrated in FIG. 8.

When the $(n-2)^{th}$ stored image on the upper sub-area $DA_{SU}$ is activated in the reproduction priority mode as illustrated in FIG. 8, if the user presses the menu/select-confirm button $15_M$, the preview image continues to be displayed on the lower sub-area $DA_{SL}$, the activated $(n-2)^{th}$ stored image is displayed on the main display area $DA_M$, the $(n-1)^{th}$ stored image is displayed on the middle sub-area $DA_{SM}$, and the $(n-3)^{th}$ stored image is displayed on the upper sub-area $DA_{SU}$ as illustrated in FIG. 9.

As described above, since the rule of displaying images in the reproduction priority mode is observed, user convenience can be enhanced.

Figure 10:
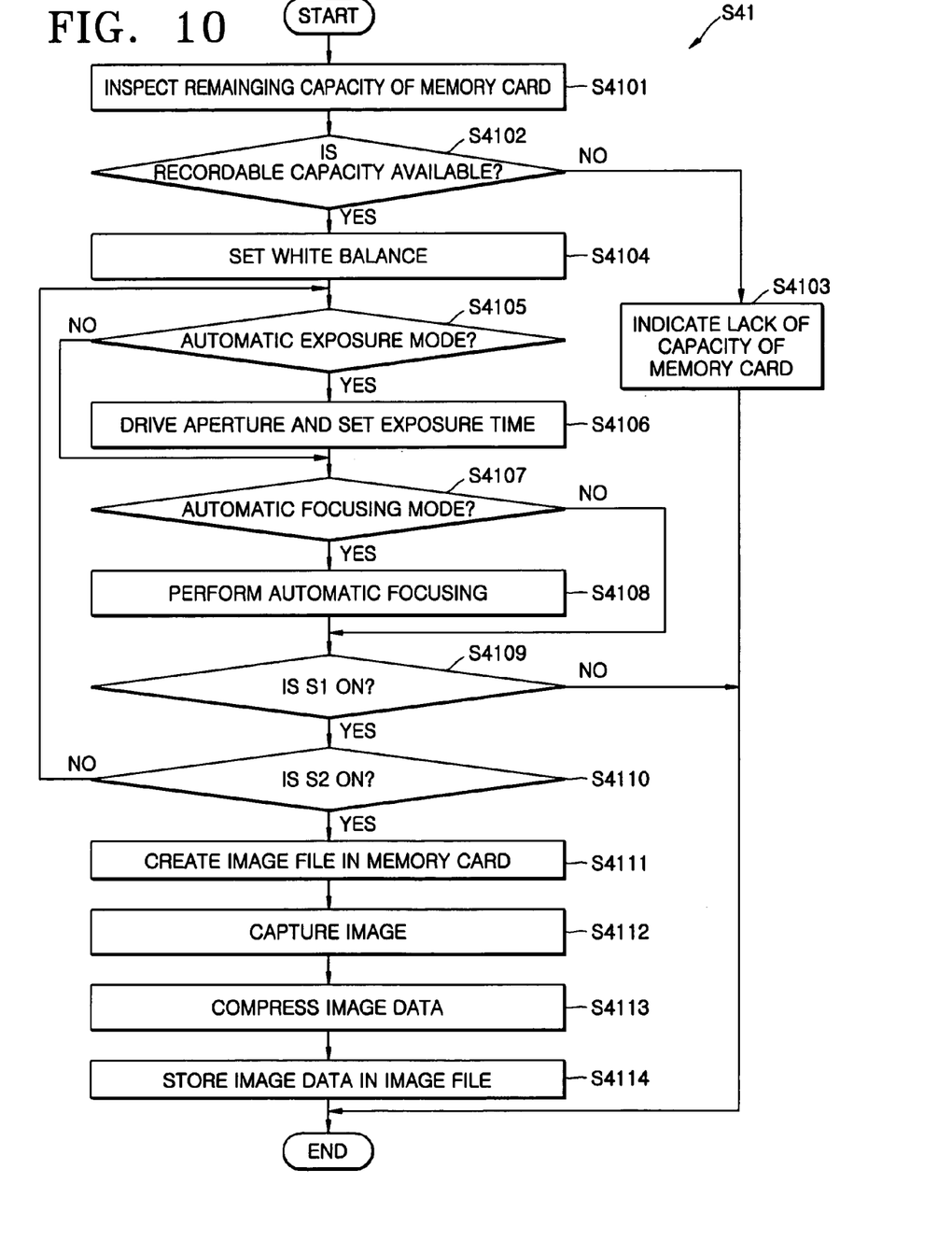
FIG. 10 is a flowchart illustrating a still-image photographing mode algorithm illustrated in FIG. 4.

FIG. 10 is a flowchart illustrating the still-image photographing mode (S41) algorithm illustrated in FIG. 4. If the integrated display mode (S23 of FIG. 4) is being performed, the still-image photographing mode is performed while the integrated display mode is maintained. The still-image photographing mode (S41) algorithm of FIG. 4 will now be described with reference to FIGS. 1 through 3 and 10.

The DSP 507 inspects the remaining capacity of the memory card (S4101) and determines whether the memory card has enough capacity to store a digital image signal (S4102). If the memory card does not have enough storage capacity, the DSP 507 indicates the lack of capacity of the memory card and ends the still-image photographing mode (S4103). If the memory card has enough storage capacity, the following operations are performed.

The DSP 507 sets white balance and parameters related to the white balance according to a present photographing condition (S4104). In the automatic exposure mode (S4105), the DSP 507 calculates the exposure by measuring incident luminance, drives the aperture driving motor $M_A$ according to the calculated exposure, and sets a shutter speed (S4106). In the automatic focusing mode (S4107), the DSP 507 performs automatic focusing and drives the focal lens (S4108).

When the first level signal S1 from the shutter release button 13 is on (S4109), the DSP 507 performs the following operations.

The DSP 507 identifies whether the second level signal S2 is on (S4110). When the second level signal S2 is not on, it means that the user did not press the shutter release button 13 to the second level to take a still photograph. Then, the DSP 507 repeats S4105 through S4110.

When the second level signal S2 is on, it means that the user fully depressed the shutter release button 13 to the second level to take a still photograph. Then, the DSP 507 creates a still-image file in the memory card (S4111). Next, the DSP 507 captures a still image (S4112). In other words, the DSP 507 receives still-image data from the CDS-ADC 501. Then, the DSP 507 compresses the received still-image data (S4113). The DSP 507 stores the compressed still-image data in the still-image file (S4114).

Figure 11:
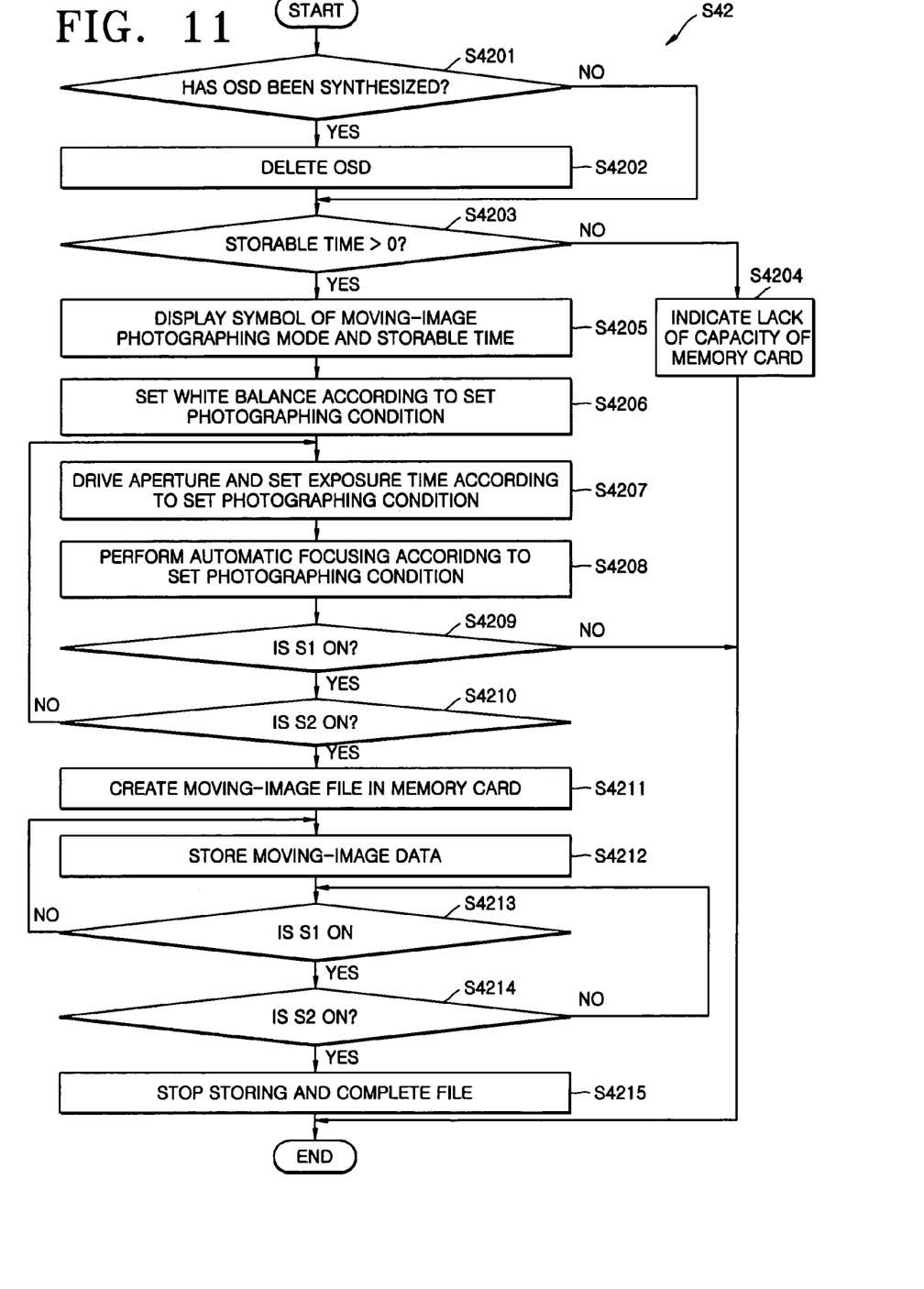
FIG. 11 is a flowchart illustrating a moving-image photographing mode algorithm illustrated in FIG. 4.

FIG. 11 is a flowchart illustrating the moving-image photographing mode (S42) algorithm illustrated in FIG. 4. If the integrated display mode (S23 of FIG. 4) is being performed, the moving-image photographing mode is performed while the integrated display mode is maintained. The moving-image photographing mode (S42) algorithm of FIG. 4 will now be described with reference to FIGS. 1 through 3 and 11.

If on-screen display (OSD) data has been synthesized with image data being output, the DSP 507 deletes the OSD data (S4201 and S4202).

The DSP 507 inspects the remaining capacity of the memory card and determines whether a storable time for storing digital moving-image data is available (S4203). When the memory card does not have enough storage capacity, the DSP 507 indicates the lack of capacity of the memory card (S4204). When the memory card has enough storage capacity, the following operations are performed.

The DSP 507 displays a symbol of the moving-image photographing mode and storable time on the LCD panel 35 (S4205).

The DSP 507 sets a white balance and parameters related to the white balance according to a set photographing condition in the moving-image photographing mode (S4206). Then, the DSP 507 performs the automatic exposure mode according to the set photographing condition (S4207). In other words, the DSP 507 calculates the exposure by measuring incident luminance, drives the aperture driving motor $M_A$ according to the calculated exposure, and sets exposure time. The DSP 507 performs automatic focusing according to the set photographing condition and drives the focus lens (S4208).

When the first level signal S1 from the shutter release button 13 is on (S4209), the DSP 507 performs the following operations.

The DSP 507 determines whether the second level signal S2 is on (S4210). When the second level signal S2 is not on, it means that the user did not press the shutter release button 13 to the second level to take a moving picture. Therefore, the DSP 507 repeats the operations 4207 through 4210.

When the second level signal S2 is on, it means that the user pressed the shutter release button 13 to the second level to take a moving picture. Accordingly, the DSP 507 creates a moving-image file in the memory card (S4211).

The DSP 507 compresses moving-image data from the CDS-ADC 501 using a motion picture experts group (MPEG) compressing algorithm or a motion joint photographic experts group (MJPEG) compressing algorithm and stores the compressed data in the moving-image file (S4212).

During this process, if both the first level signal S1 and the second level signal S2 from the shutter release button 13 are on, the DSP 507 stops storing the moving-image data and sets (i.e., completes) the moving-image file (S4213 through S4215).

Figure 12:
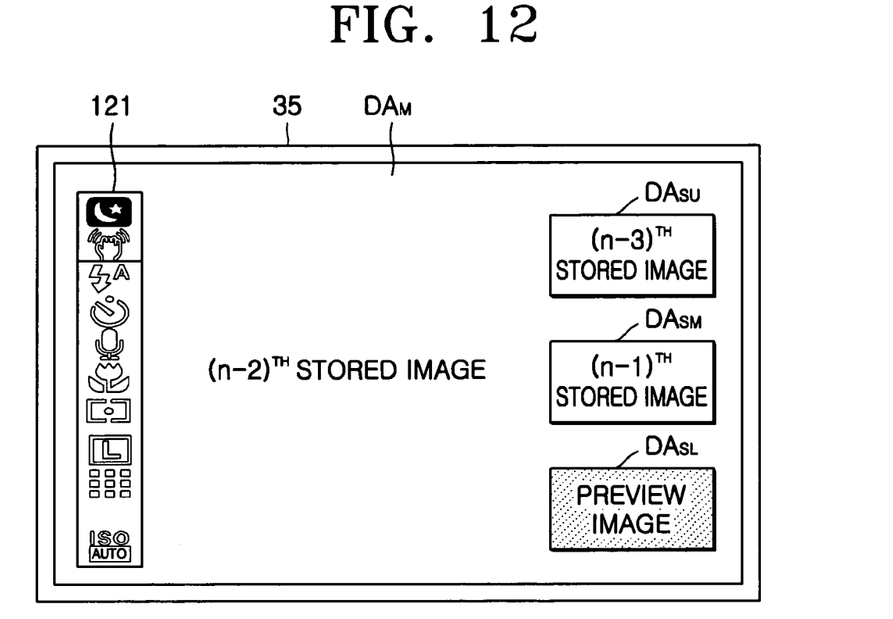
FIG. 12 is a view illustrating a screen obtained as a result of performing the second example of the integrated display mode illustrated in FIG. 4.

FIG. 12 is a view illustrating a screen obtained as a result of performing the second example of the integrated display mode (S23) illustrated in FIG. 4. Like reference numerals used in FIGS. 12 and 9 denote like elements. Referring to FIG. 12, current photographing information is displayed on the left of the color LCD panel 35. Accordingly, the user can quickly identify and modify the current photographing information.

Figure 13:
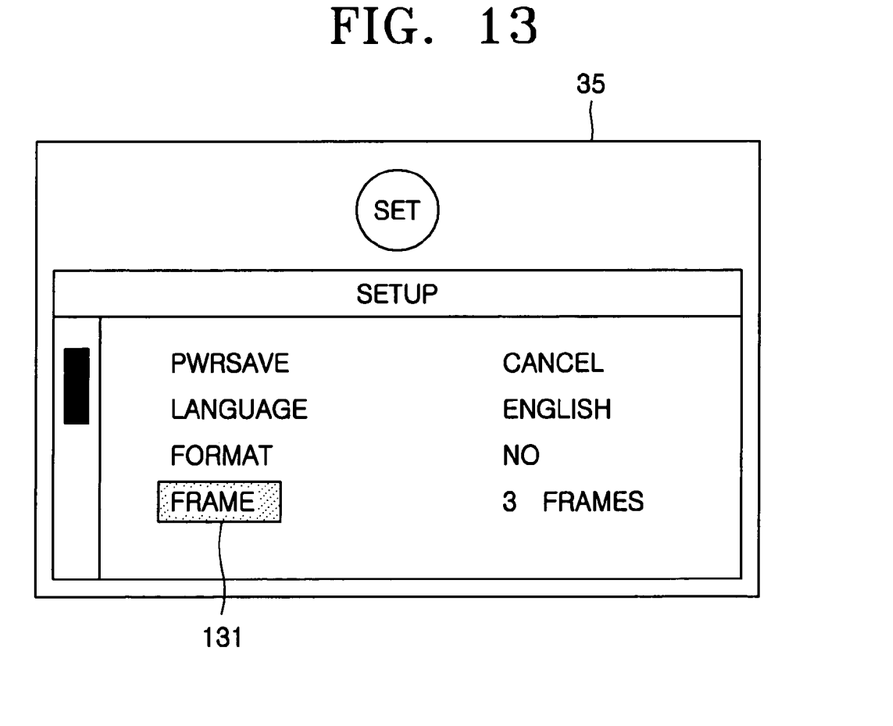
FIGS. 13 and 14 are views for illustrating a process in which a user sets the number of sub-areas in a setting mode of FIG. 4 to perform the integrated display mode of FIG. 4.
Figure 14:
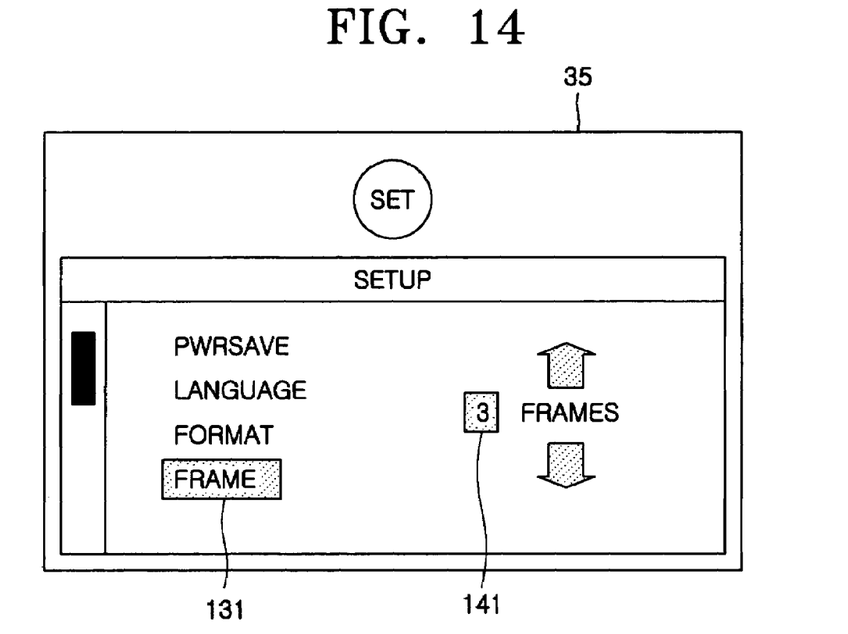

FIGS. 13 and 14 are views for illustrating a process in which the user sets or defines a quantity 141 of frames (i.e., sub-areas) in the setting mode (S6) of FIG. 4 to perform the integrated display mode (S23) of FIG. 4. Reference number 35 in FIGS. 13 and 14 indicate the color LCD panel 35 of FIG. 2, which is displaying a setting menu with a number of user-selectable items for changing the camera's operating settings (e.g., powersave, language, format, etc.)

Referring to FIG. 13, the user presses the macro/down button $15_D$ of FIG. 2 and activates the "FRAME" item 131. Accordingly, the user can define the quantity item 141 for sub-areas that will be disposed on the display 35 by pressing, for example, the macro/down button $15_D$ to decrease the currently displayed quantity item 141, the voice-memo/up button $15_U$ to increase the currently displayed quantity item 141 and the menu/select-confirm button $15_M$ to confirm the increase or decrease. Herein, the quantity item 141 may be increased or decreased by an integer value (e.g., 1). Further, the item 141 may be in the range from one to a number one less than the quantity of images stored in the storage medium. More particularly, the item 141 may be selected from the range of one to eight.

Figure 15:
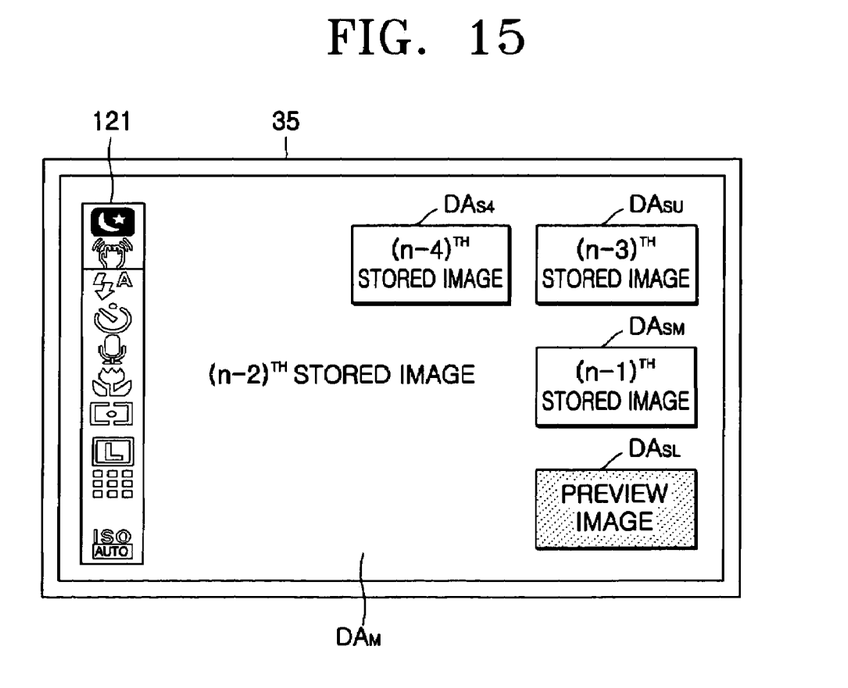
FIG. 15 is a view illustrating a screen obtained as a result of performing the third example of the integrated display mode illustrated in FIG. 4.

FIG. 15 is a view illustrating a screen obtained as a result of performing the third example of the integrated display mode (S23) illustrated in FIG. 4. Like reference numerals used in FIGS. 15 and 12 denote like elements. Referring to FIG. 15, if the number 141 of sub-areas is set to four as a result of performing the process illustrated in FIGS. 13 and 14, images are selectively displayed on five areas such as the main display area $DA_M$, the lower sub-area $DA_{SL}$, the middle sub-area $DA_{SM}$, the upper sub-area $DA_{SU}$, and a fourth sub-area $DA_{S4}$.

If the (n−1)$^{th}$ stored image is displayed on the upper sub-area DA$_{SU}$ and the (n−3)$^{th}$ stored image is displayed on the middle sub-area DA$_{SM}$, the fourth sub-area DA$_{S4}$ may be positioned close to the lower sub-area DA$_{SL}$ in the lower part of the color LCD panel 35.

The main display area DA$_M$ may refer to all areas of a display panel or particular areas excluding the sub-areas. The same is true in FIGS. 16 and 17, which will now be described.

Figure 16:
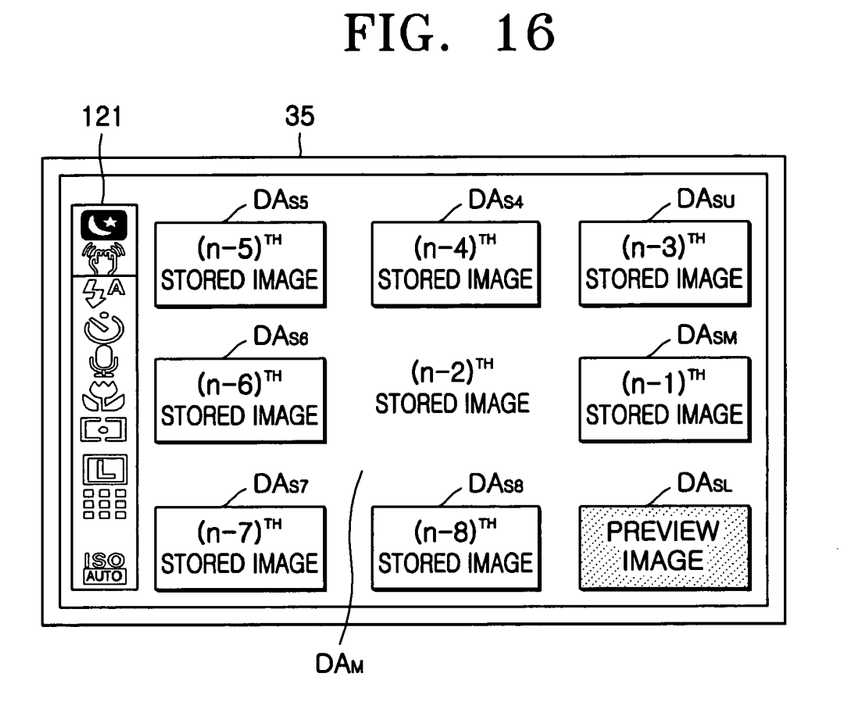
FIG. 16 is a view illustrating a screen obtained as a result of performing the fourth example of the integrated display mode illustrated in FIG. 4.

FIG. 16 is a view illustrating a screen obtained as a result of performing the fourth example of the integrated display mode (S23) illustrated in FIG. 4. Like reference numerals used in FIGS. 16 and 12 denote like elements. Referring to FIG. 16, if the number 141 of sub-areas is set to eight as a result of performing the process illustrated in FIGS. 13 and 14, the display 35 is subdivided into nine equal areas for displaying the preview image and the eight defined stored images. As shown, the nine areas are the main display area DA$_M$, the lower sub-area DA$_{SL}$, the middle sub-area DA$_{SM}$, the upper sub-area DA$_{SU}$, and fourth through eighth sub-areas DA$_{S4}$ through DA$_{S8}$, wherein the main display area DA$_M$ is central to and framed by the sub-areas, which are arranged about the perimeter of the display. As shown, the images are displayed in a clockwise direction according to the order in which they are stored, but may alternatively be arranged otherwise or in another order.

If the (n−1)$^{th}$ stored image is displayed on the upper sub-area DA$_{SU}$ and the (n−3)$^{th}$ stored image is displayed on the middle sub-area DA$_{SM}$, the images may be displayed in a counter-clockwise direction according to the order in which they are stored.

Figure 17:
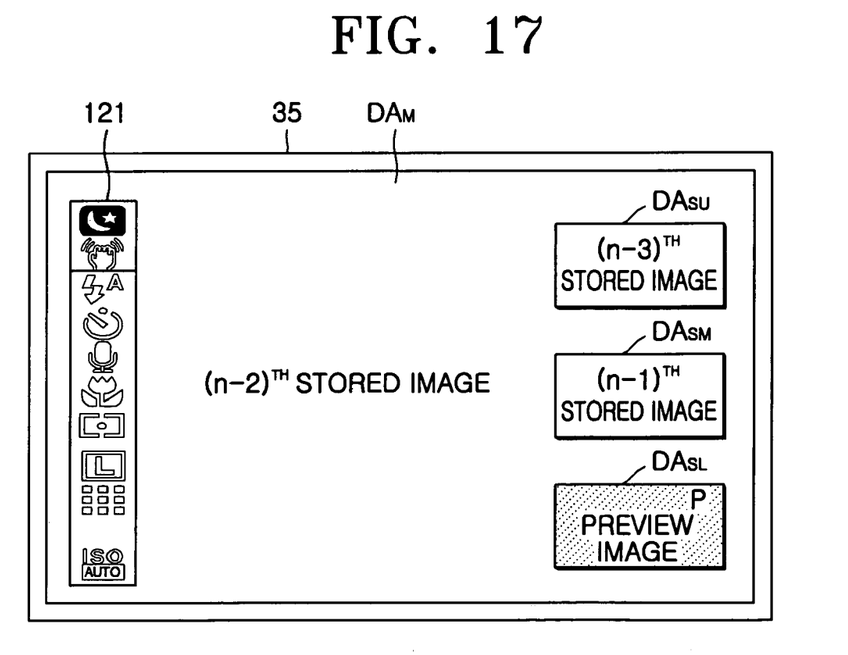
FIG. 17 is a view illustrating a screen obtained as a result of performing the fifth example of the integrated display mode illustrated in FIG. 4.

FIG. 17 is a view illustrating a screen obtained as a result of performing the fifth example of the integrated display mode (S23) illustrated in FIG. 4. Like reference numerals used in FIGS. 17 and 12 denote like elements. Referring to FIG. 16, symbol "P" indicating that the preview image is displayed on the lower sub-area DA$_{SL}$ is synthesized with the preview image and displayed. Thus, the user can easily recognize the preview image while viewing stored images. Consequently, the user can take a photograph quickly even when reviewing stored image files in the camera storage medium. If the stored images are displayed on more sub-areas as illustrated in FIG. 16, such effects may be enhanced.

As described above, according to a digital photographing apparatus that performs an integrated display mode and a method of controlling the same, when a first stored image that was selected is displayed on a main area, a preview image is displayed on a first sub-area. Thus, a user does not need to perform an additional operation to display the preview image on the main area to take a photograph. Accordingly, the user can immediately take a photograph of a subject even when a selected image is displayed on the main area. In other words, the user can perform photographing and reproducing operations easily and quickly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus including a display panel, the method comprising:
   providing a display sub-area on the display panel;
   receiving a signal according to one of a user-actuated first mode to capture an image and store said image to a memory, and a user-actuated second mode to reproduce said image from said memory;
   displaying a preview image in one of a main display area of the display panel and the display sub-area relative to the receiving step;
   reproducing said image from said memory in the other one of said main display area and said display sub-area; and
   exchanging said image with said preview image, wherein the exchanging step comprises:
      receiving a first signal from a user activating said display sub-area;
      receiving a second signal from the user actuating a confirmation means;
      replacing a first image in said main display area with a second image in said display sub-area; and
      substantially simultaneously with the step of replacing a first image in said main display area with a second image in said display sub-area, replacing the second image in said display sub-area with the first image in said main display area.

2. The method of claim 1 further comprising the step of displaying photographing information relative to an image displayed on said main display area.

3. The method of claim 2 wherein the photographing information is displayed on a left side of said main display area.

4. The method of claim 1 further comprising:
   defining a sub-area quantity; and
   disposing the quantity of sub-areas on the display panel.

5. The method of claim 4 wherein the defining step comprises:
   displaying a setting menu on the display panel; and
   receiving a signal according to a user-actuated selection of a number from a sub-area selection item, wherein the number is an integer being less than a quantity of stored images in the memory.

6. The method of claim 5 wherein the integer is selected from the range of one to eight.

7. The method of claim 4 further comprising the step of arranging the quantity of sub-areas about a perimeter of the display panel.

8. The method of claim 7 further comprising the step of synthesizing an indicium with the preview image when the preview image is being displayed in one of the sub-areas.

9. The method of claim 1, wherein:
   the displaying step displays said preview image in the main display area prior to taking said preview image as a photograph image; and
   the exchanging step displays said preview image in one of the display sub-areas prior to taking said preview image as said photograph image while displaying said image from said memory in said main display area.

10. A method of simultaneous image capture and review of stored images in a digital camera apparatus including a display and a memory, the method comprising:
   subdividing the display into a main display area and at least two display sub-areas;
   continuously generating a preview image signal relative to light reflected from a subject and incident on an optical system;
   driving one of the main display area and a display sub-area of the at least two display sub-areas with the preview image signal;
   driving each of the main display area and the display sub-areas not driven by the preceding driving step with a different stored image data; and
   swapping an image displayed in one of the at least two display sub-areas with an image displayed in the main display area, wherein the swapping step comprises:

receiving a first signal according to a user's activation of a display sub-area;

receiving a second signal according to a user's actuation of a confirmation means;

resizing an image from the activated display sub-area to occupy the main display area; and substantially simultaneously with the proceeding resizing step, second resizing an image from the main display area to occupy the activated display sub-area.

11. The method of claim 10 further comprising the step of displaying photographing information relative to the preview image signal on said main display area.

12. The method of claim 10 further comprising:

defining a sub-area quantity; and disposing the quantity of sub-areas on the display panel.

13. The method of claim 12 wherein the defining step comprises:

displaying a setting menu on the display panel; and receiving a signal according to a user-actuated selection of a number from a sub-area selection item, wherein the number is an integer being less than a quantity of stored images in the memory.

14. The method of claim 12 further comprising the step of arranging the quantity of sub-areas about a perimeter of the display panel.

15. The method of claim 14 wherein images reproduced in the sub-areas from said memory are arranged in a clockwise direction according to a chronological order that said images were stored.

16. The method of claim 10 further comprising the step of synthesizing an indicium with the preview image signal when the preview image is being displayed in one of the sub-areas.

17. The method of claim 10, wherein:

the step of driving one of the main display area and a display sub-area displays said preview image in the main display area prior to taking said preview image as a photograph image; and the swapping step displays said preview image in one of the display sub-areas prior to taking said preview image as said photograph image while displaying said image from said memory in said main display area.

18. A method of controlling a digital photographing apparatus that displays a preview image, which is an image formed by light incident through an optical system, and a plurality of images stored in a storage medium on a main area and a plurality of sub-areas of a display panel, the method comprising:

displaying a first stored image on the main area and displaying the preview image on the first sub-area, if the first stored image displayed on a first sub-area is selected in response to a command signal generated by a user when the preview image is displayed on the main area of the display panel, wherein the step of displaying said preview image displays said preview image on the first sub-area prior to taking said preview image as a photograph image; and exchanging said preview image with said first stored image by displaying said preview image on the main area prior to taking said preview image as said photograph image while displaying said first stored image on the first sub-area.

19. A method of controlling a digital photographing apparatus including a display panel, the method comprising:

providing a display sub-area on the display panel;

receiving a signal according to one of a user-actuated first mode to capture an image and store said image to a memory, and a user-actuated second mode to reproduce said image from said memory;

displaying a preview image in one of a main display area of the display panel and the display sub-area relative to the receiving step;

reproducing said image from said memory in the other one of said main display area and said display sub-area; and exchanging said image with said preview image;

wherein:

the displaying step displays said preview image in the main display area prior to taking said preview image as a photograph image; and the exchanging step displays said preview image as said photograph image while displaying said image from said memory in said main display area.

20. A method of simultaneous image capture and review of stored images in a digital camera apparatus including a display and a memory, the method comprising:

subdividing the display into a main display area and at least two display sub-areas;

continuously generating a preview image signal relative to light reflected from a subject and incident on an optical system;

driving one of the main display area and a display sub-area of the at least two display sub-areas with the preview image signal;

driving each of the main display area and the display sub-areas not driven by the preceding driving step with a different stored image data; and swapping an image displayed in one of the at least two display sub-areas with an image displayed in the main display area;

wherein:

the step of driving one of the main display area and a display sub-area displays said preview image in the main display area prior to taking said preview image as a photograph image; and the swapping step displays said preview image in one of the display sub- areas prior to taking said preview image as said photograph image while displaying said image from said memory in said main display area.

* * * * *